United States Patent
Kodama et al.

[11] Patent Number: 6,089,277
[45] Date of Patent: Jul. 18, 2000

[54] FUEL TRANSPORTING HOSE HAVING INNER LAYER MADE OF FLUORINE-CONTAINED RESIN

[75] Inventors: Tsutomu Kodama, Komaki; Kazuhiro Kato, Nagoya, both of Japan

[73] Assignee: Tokai Rubber Industries, Ltd., Japan

[21] Appl. No.: 08/099,929

[22] Filed: Aug. 3, 1993

[30] Foreign Application Priority Data

Aug. 7, 1992 [JP] Japan ................... 4-211510
Aug. 7, 1992 [JP] Japan ................... 4-211511

[51] Int. Cl.⁷ ........................................ F16L 11/08
[52] U.S. Cl. .................. 138/126; 138/124; 138/137; 138/141; 138/DIG. 3
[58] Field of Search ........................ 138/126, 137, 138/124, 125, 127, 141, DIG. 3

[56] References Cited

U.S. PATENT DOCUMENTS

| | | | |
|---|---|---|---|
| 4,316,789 | 2/1982 | Iijima et al. | 204/296 |
| 4,330,017 | 5/1982 | Satoh et al. | 138/126 |
| 4,444,700 | 4/1984 | Fondren | 264/24 |
| 4,840,849 | 6/1989 | Harada et al. | 428/419 |
| 4,880,036 | 11/1989 | Kitami et al. | 138/137 |
| 4,887,647 | 12/1989 | Igarashi et al. | 138/126 |
| 4,942,906 | 7/1990 | Igarashi et al. | 138/126 |
| 4,950,436 | 8/1990 | Kitami et al. | 264/103 |
| 4,984,604 | 1/1991 | Nishimura | 138/137 |
| 4,996,076 | 2/1991 | Nakaya et al. | 427/38 |
| 5,192,476 | 3/1993 | Green | 264/127 |
| 5,223,571 | 6/1993 | Igarashi et al. | 138/126 |

FOREIGN PATENT DOCUMENTS

| | | |
|---|---|---|
| 0385731 | 9/1990 | European Pat. Off. . |
| 3727844 | 3/1988 | Germany . |
| 3739089 | 5/1988 | Germany . |
| 3914011 | 11/1989 | Germany . |
| 49-7938 | 2/1974 | Japan ................. F16I 11/00 |

OTHER PUBLICATIONS

Chemical Patents Index, Documentation Abstracts Journal, Section Ch, Week 9034, Derwent Publications, Ltd., London, GB; An 90–256358 & JP–A–2 178 038 (Tokai Rubber Ind. KK.).

Primary Examiner—Patrick Brinson
Attorney, Agent, or Firm—Parkhurst & Wendel, L.L.P.

[57] ABSTRACT

A fuel transporting hose used in a fuel pipe system is disclosed which includes: an inner layer made of a fluorine-contained resin; an intermediate layer made of a rubber material and formed on an outer surface of the inner layer; a fiber reinforcing layer formed on an outer surface of the intermediate layer; and an outer layer made of a rubber material and formed on an outer surface of the intermediate layer. The intermediate layer has a thickness which is 3 to 30 times as that of the inner layer, and the outer layer has a thickness which is 3 to 35 times as that of the inner layer.

20 Claims, 1 Drawing Sheet ered hose has improved resistance to firing.

FUEL TRANSPORTING HOSE HAVING INNER LAYER MADE OF FLUORINE-CONTAINED RESIN

BACKGROUND OF THE INVENTION

1. Field of the Invention

The present invention relates to a fuel transporting hose which is suitably used in a fuel pipe system of an automobile, for transporting a liquid such as gasoline or a gas.

2. Discussion of the Related Art

There are known various kinds of hoses made of various materials, for use in a fuel pipe system of an automobile or other vehicle. Such hose may be used as a fuel pipe itself or as a connector for connecting fuel pipes. For example, there is known a hose which consists of: an innermost layer made of fluororubber (FKM); an intermediate layer formed on the innermost layer and made of a rubber material, such as a copolymer of epichlorohydrin-ethylene oxide-allylglycidyl ether (ECO), acrylonitrile-butadiene rubber (NBR), and chlorosulphonated polyethylene (CSM); an outermost layer formed on the intermediate layer and made of ECO; and a reinforcing layer formed between the intermediate layer and the outermost layer, by braided reinforcing fibers.

The above-described four-layered hose including the fiber reinforcing layer has excellent properties required for its use in the fuel pipe system of the automobile, which properties include the resistance to sour gasoline which contains peroxides produced upon oxidation of gasoline at a high temperature, and the ability to prevent permeation of gasoline therethrough, in other words, gasoline impermeability. In producing the hose, however, each layer of the hose needs to be formed with a sufficiently large thickness, which requires a large amount of expensive fluororubber to be used for the innermost layer, resulting in an increased cost of manufacture of the hose. Further, the process of producing the hose includes a series of cumbersome steps, e.g., extrusion-braiding-extrusion-vulcanization.

As a fuel transporting hose for use in a fuel pipe system of an automobile or others, there is also known a hose which consists of a single layer made of a polyamide resin, and a hose which consists of a resin tube made of fluorine-contained resin, and a reinforcing layer formed by braiding a metallic wire on the outer surface of the resin tube.

While the hose consisting solely of the polyamide resin layer is available at a relatively low cost, the hose is unsatisfactory in the resistance to sour gasoline, the gasoline impermeability (including the impermeability to alcohol blended gasoline), and the flexibility. This hose is also unsatisfactory in the resistance to wear (hereinafter referred to as "wear resistance") due to its contact with other hoses when the hose is installed in a narrow space within an automobile body, and in the resistance to shocks such as that caused by stones hit by the automobile during its running (hereinafter referred to as "shock resistance"). Further, the inner wall of the hose of this type tends to be electrically charged, due to static electricity caused by friction between the inner wall and a fuel liquid such as gasoline. If a voltage higher than a give level appears across the hose, spark may take place between the hose and metallic parts of the body supporting the hose, for example, and the spark may form holes through the hose, or may cause the fuel to ignite. Thus, the hose consisting solely of the polyamide resin layer also has a problem in respect of the resistance to firing.

The other type of the above-indicated hose with the reinforcing layer in the form of the wire formed by braiding on the fluorine-contained resin tube ensures sufficiently high degrees of resistance to sour gasoline and gasoline impermeability, due to the use of the fluorine-contained resin, and also ensures high degrees of wear resistance and shock resistance, due to the use of the braided reinforcing layer. However, like the polyamide single-layer hose as described above, the hose having the fluorine-contained resin layer is unsatisfactory in the flexibility and the resistance to firing. Further, the cost of manufacturing of this type of hose is relatively high due to the use of expensive fluorine-contained resin.

SUMMARY OF THE INVENTION

It is therefore an object of the present invention to provide a fuel transporting hose used in a fuel pipe system of an automobile, which has excellent properties in respect of the flexibility and the resistance to firing, as well as the resistance to sour gasoline, the gasoline impermeability, the wear resistance and the shock resistance, and which can be manufactured at a reduced cost.

The above object of the invention may be attained according to the principle of the invention, which provides a fuel transporting hose used in a fuel pipe system, comprising: an inner layer made of a fluorine-contained resin; an intermediate layer made of a rubber material and formed on an outer surface of the inner layer, the intermediate layer having a thickness which is 3 to 30 times as that of the inner layer; a fiber reinforcing layer formed on an outer surface of the intermediate layer; and an outer layer made of a rubber material and formed on an outer surface of the intermediate layer, the outer layer having a thickness which is 3 to 35 times as that of the inner layer.

Studies were conducted by the inventors of the present invention in an attempt to provide a fuel transporting hose which assures excellent flexibility as well as high degrees of resistance of various kinds as described above and which is available at a reduced cost. To this end, the inner layer of the present fuel transporting hose is formed of the fluorine-contained resin, and the intermediate layer made of a rubber material is formed on the inner layer. Then, the fiber reinforcing layer is formed on the intermediate layer, and the outer layer made of a rubber material is formed on the fiber reinforcing layer. The thus formed hose is excellent in the gasoline impermeability and the resistance to sour gasoline, due to the use of the fluorine-contained resin for the inner layer, and also assures high degrees of wear resistance and shock resistance due to the provision of the fiber reinforcing layer. The thicknesses of the intermediate and outer layers are suitably controlled in the above-indicated respective ranges with respect to the thickness of the inner layer as a reference value. Consequently, the inner layer has a relatively small thickness, whereby the hose as a whole exhibits improved flexibility, and the cost of manufacturing of the hose can be advantageously reduced with a reduced amount of expensive fluorine-contained resin used in the hose.

According to one feature of the invention, the fluorine-contained resin of the inner layer may contain an electrically conductive additive. As a result of studies by the inventors on the firing resistance of the hose, it was revealed that if electrical conductivity is given to the inner layer of the hose which contacts with a fuel, the static electricity which occurs due to friction between the fuel and the inner wall of the hose normally escapes through the opposite ends of the hose. Consequently, the inner wall of the hose is not electrically charged, thus avoiding the spark caused by the static electricity, and resultant firing. Thus, the fuel transporting hose having the electrically conductive inner layer is excellent in the resistance to firing.

BRIEF DESCRIPTION OF THE DRAWINGS

The above and optional objects, features and advantages of the present invention will be better understood by reading the following detailed description of its presently preferred embodiments, when considered in conjunction with the accompanying drawings, in which.

DETAILED DESCRIPTION OF THE INVENTION

Figure 1:
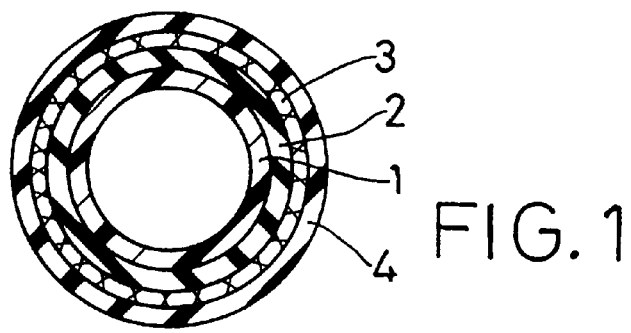
FIG. 1 is a cross sectional view of one embodiment of the present invention, in the form of a fuel transporting hose used in a fuel pipe system of an automobile.

The fuel transporting hose according to the present invention is composed of an inner layer made of a fluorine-contained resin, an intermediate layer made of a rubber material and formed on the inner layer, a fiber reinforcing layer formed on the intermediate layer, and an outer layer made of a rubber material and formed on the fiber reinforcing layer.

The fluorine-contained resin or fluororesin used for forming the inner layer of the hose may be selected from polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

The above-indicated fluorine-contained resin may be given electrical conductivity. For example, the resin contains an electrically conductive additive dispersed therein, such that the inner layer has a volume resistivity of not higher than $10^{10} \Omega \cdot cm$. The electrically conductive additive may be selected from carbon black, fine stainless steel fibers, and others.

The rubber material used for forming the intermediate layer may be selected from: NBR; H-NBR (hydrogenated NBR); ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

The fiber reinforcing layer is formed by braiding or spiraling, using synthetic fiber such as nylon fiber, polyester fiber or aramid fiber, or natural fiber such as cotton fiber.

The rubber material used for forming the outer layer may be selected from those indicated above for forming the intermediate layer.

The instant fuel transporting hose used in a fuel pipe system of an automobile may be produced in the following manner. Initially, a tubular body which gives the inner layer is formed by extruding the fluorine-contained resin from an extruder onto a mandrel. Then, the rubber material as indicated above is extruded on the outer circumferential surface of the tubular body (inner layer), to form the intermediate layer thereon. Then, the fiber reinforcing layer is formed on the outer surface of the intermediate layer, by braiding or spiraling the above-indicated reinforcing fibers.

Thereafter, the rubber material for forming the outer layer is extruded on the outer circumferential surface of the fiber reinforcing layer. These inner, intermediate, fiber reinforcing and outer layers are then formed into an integral structure by heat and vulcanization, and pulled out of the mandrel. Thus, a four-layered hose for use in a fuel pipe system of an automobile is produced. The vulcanization as described above is generally effected for 30–60 min. at a temperature of 150–160° C. When the fluorine-contained resin of the inner layer contains the electrically conductive additive as described above, the content of the conductive additive is preferably determined so that the inner layer has a volume resistivity of not higher than $10^{10} \Omega \cdot cm$. For instance, the fluorine-contained resin contains 3–16 parts by weight of the conductive additive, per 100 parts by weight of the fluorine-contained resin.

The fuel transporting hose obtained in the above-described manner is illustrated in FIG. 1, which consists of the inner layer 1 formed of the fluorine-contained resin, the intermediate layer 2 formed of the rubber material, the fiber reinforcing layer 3, and the outer layer 4 formed of the rubber material. An electrically conductive additive may be added to the fluorine-contained resin of the inner layer 1. In the instant fuel transporting hose, the thickness of the intermediate layer 2 is controlled to be 3 to 30 times as that of the inner layer 1, and the thickness of the outer layer 4 is controlled to be 3 to 35 times as that of the inner layer 1. Since the thickness of the inner layer 1 is made sufficiently smaller than the other layers, the flexibility of the hose is enhanced, and the cost of manufacturing of the hose can be reduced with a reduced amount of expensive fluorine-contained resin used in the hose. More specifically, the thickness of the inner layer 1 is preferably held within a range of 50 μm~0.5 mm, more preferably 0.2±0.1 mm, and the thickness of the intermediate layer 2 is preferably held within a range of 0.6 mm~2.0 mm, more preferably 1.0±0.2 mm. The thickness of the outer layer 4 is preferably within a range of 0.5 mm~5 mm, more preferably 2±1 mm.

Figure 2:
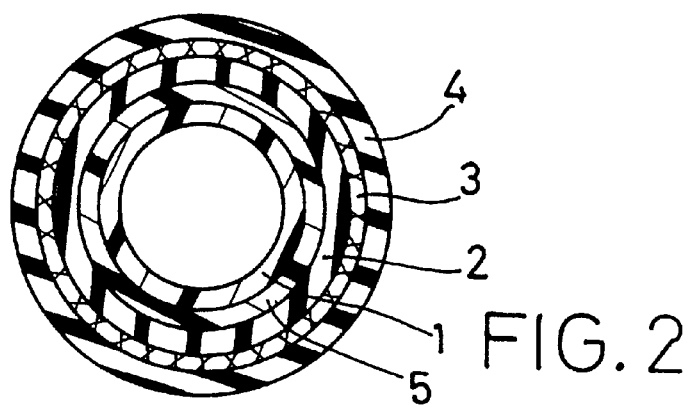
FIG. 2 is a cross sectional view showing another embodiment of the fuel transporting hose of the present invention.

In another embodiment of the fuel transferring hose of the present invention as shown in FIG. 2, an adhesive layer 5 is formed between the inner layer 1 formed of the fluorine-contained resin and the intermediate layer 2 formed of the rubber material, so as to improve the bonding strength between the inner and intermediate layers 1 and 2. The adhesive layer 5 may be formed from a silane coupling agent or the like, which is generally applied by coating to the inner layer 1 after the formation of the inner layer 1.

Alternatively, the outer circumferential surface of the inner layer 1 may be subjected to a suitable surface treatment after the formation of the inner layer 1, so as to improve the bonding strength between the inner layer 1 and the intermediate layer 2. The above surface treatment may be selected from: flame treatment; corona discharge method; sputtering; plasma treatment; sodium treatment in which the surface of the layer 1 is activated by removing fluorine therefrom; and other treatments.

EXAMPLES

There will be described in detail some examples of the fuel transporting hose of the present invention, along with comparative examples.

Examples 1, 2A, 2B

According to the method as described above, three four-layered fuel transporting hoses (having an inside diameter of 6 mm) for use in a fuel pipe system of an automobile were produced as Examples 1, 2A and 2B, using the materials as indicated in TABLE 1 below. In each of the Examples, the fiber reinforcing layer was formed by braiding.

TABLE 1

|  |  | Example 1 | Example 2A | Example 2B |
|---|---|---|---|---|
| Inner layer | Material | PVDF | CTFE | CTFE |
|  | Thickness (mm) | 0.2 | 0.1 | 0.1 |
| Intermediate layer | Material | CSM | ECO | ECO |
|  | Thickness (mm) | 0.8 | 1.2 | 2.0 |
| Fiber reinforcing layer | Fiber Braiding | Polyester 24 carriers double yarn | Polyester 24 carriers double yarn | Polyester 24 carriers double yarn |
| Outer layer | Material | ECO | CSM | CSM |
|  | Thickness (mm) | 1.0 | 3.0 | 2.0 |

Examples 3–5

According to the method as described above, four four-layered fuel transporting hoses (having an inside diameter of 6 mm) for use in a fuel pipe system of an automobile were produced as Examples 3, 4A, 4B and 5, using the materials as indicated in TABLE 2 and TABLE 3 below. In each of the Examples, the fiber reinforcing layer was formed by braiding.

TABLE 2

|  |  | Example 3 | Example 4A |
|---|---|---|---|
| Inner layer | Material | PVDF | PVDF |
|  | Carbon black Content*[1] (parts) | Medium-purity 12 | High-purity 8 |
|  | Volume resistivity ($\Omega \cdot cm$) | $4.2 \times 10^6$ | $5.1 \times 10^4$ |
|  | Thickness (mm) | 0.2 | 0.2 |
| Intermediate layer | Material | CSM | CSM |
|  | Thickness (mm) | 0.8 | 0.8 |
| Fiber reinforcing layer | Fiber Braiding | Polyester 24 carriers (double yarn) | Polyester 24 carriers (double yarn) |
| Outer layer | Material | ECO | ECO |
|  | Thickness (mm) | 1.0 | 1.0 |

*[1]parts by weight per 100 parts by weight of fluorine-contained resin

TABLE 3

|  |  | Example 5 |
|---|---|---|
| Inner layer | Material | CTFE |
|  | Carbon black Content*[1] (parts) | High-purity 8 |
|  | Volume resistivity ($\Omega \cdot cm$) | $3.8 \times 10^4$ |
|  | Thickness (mm) | 0.1 |
| Intermediate layer | Material | ECO |
|  | Thickness (mm) | 1.2 |
| Fiber reinforcing layer | Fiber Braiding | Polyester 24 threads (double yarn) |
| Outer layer | Material | CSM |
|  | Thickness (mm) | 3.0 |

*[1]parts by weight per 100 parts by weight of fluorine-contained resin

Comparative Example 1

As Comparative Example 1, there was produced a hose consisting of a single layer made of nylon 11 and formed by using an extruder.

Comparative Example 2

As Comparative Example 2, there was produced a double-layered hose which consists of a resin layer formed of a fluorine-contained resin (PVDF) and a reinforcing layer formed from a metallic layer. The resin layer was formed by extruding the fluorine-contained resin by means of an extruder, and the reinforcing layer is formed by braiding on the outer surface of the resin layer.

With respect to the above-described fuel transporting hoses of Examples 1–5 and Comparative Examples 1 and 2, measurements and evaluation were conducted in respect of the bursting pressure, gasoline impermeability, resistance to sour gasoline, and flexibility. In addition, with respect to the hoses of Examples 3–5 and Comparative Examples 1 and 2, measurement and evaluation were conducted in respect of the resistance to firing and flame resistance. The results are indicated in TABLE 4 through TABLE 6. The bursting pressure and other properties of each specimen of the hoses were measured and evaluated in the following manners.

[Bursting Pressure]

A pressure (hydraulic pressure) applied to each specimen of the hoses was continuously increased until the hose burst, and the maximum pressure was measured at which the burst of the hose occurred or the water leaked from the hose through pin-holes.

[Gasoline Impermeability]

Two kinds of gasoline, i.e., a test gasoline and a mixed gasoline which is a 50:50 volume blend of the test gasoline and methanol were prepared. The test gasoline and mixed gasoline were sealed into respective specimens of the hoses, which were then left at a temperature of 40° C., and the amount of reduction in the weight of the gasoline (g/m$^2$ per day) was measured. The same measurement was conducted on a conventional hose which has the same inside diameter as the above specimens, and includes an inner layer made of fluororubber (FKM), an intermediate layer made of ECO, an outer layer made of ECO and formed outwardly of the intermediate layer, and a fiber reinforcing layer formed between the intermediate layer and the outer layer. The measurement result of the conventional hose is used as a reference value "1", and the measurement results, that is, gasoline impermeability values of Examples 1–5 and Comparative Examples 1 and 2 are indicated on the basis of the reference value in TABLE 4 through TABLE 6.

[Resistance to sour gasoline]

The sour gasoline containing peroxides was circulated through each specimen of the hoses, and any crack or other abnormality which appeared on the inner surface of the hose was recognized. The circulation of the sour gasoline was effected at 40–60° C., under a pressure of 2.5 kgf/cm$^2$. In the TABLES, "⊙" indicates that no abnormality was recognized in the specimen, and "O" indicates that almost no abnormality was recognized, while "Δ" indicates that slight abnormality was recognized, and "X" indicates that some abnormality was recognized.

[Flexibility]

Figure 3:
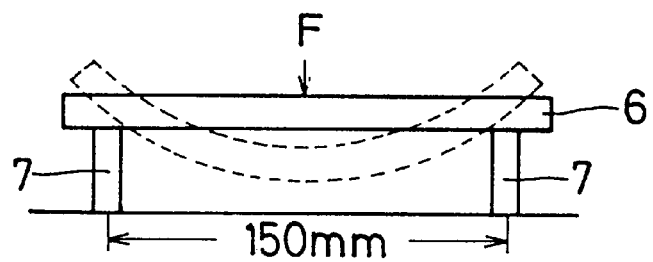
FIG. 3 is a view explaining the manner of measuring the flexibility of hoses.

Each specimen 6 of the hoses was laid across two spaced-apart support rods 7, as shown in FIG. 3, and a varying amount of load (F) was applied to a middle point of the hose 6. The amount of the load (kgf) was measured at the moment when the hose 6 was bent or flexed and displaced 50 mm downwards, as indicated by a one-dot chain line in FIG. 3.

[Electrical resistance]

The volume resistivity ($\Omega \cdot cm$) of each specimen of the hoses was measured according to JIS (Japanese Industrial Standard) (K-6911).

[Resistance to firing]

A metallic needle was brought close to each specimen of the hoses to which an electrical charge of 30–50 kV was applied, and spark phenomena were observed.

[Flame resistance]

Each specimen of the hoses was subjected to a pneumatic pressure of 3–4 kgf/cm², and a flame of 700–800° C. was brought into contact with the thus pressurized hose. The length of time from the contact of the flame and hose to the burst of the hose was measured.

TABLE 4

|  | Example | | |
|---|---|---|---|
|  | 1 | 2A | 2B |
| Bursting Pressure (kgf/cm²) | 100–120 | 100–120 | 100–120 |
| Gasoline Impermeability |  |  |  |
| Test gasoline | 0.5 or less | 0.5 or less | 0.5 or less |
| Mixed gasoline | 0.5 or less | 0.5 or less | 0.5 or less |
| Resistance to sour gasoline | ⊚ | ⊚ | ⊚ |
| Flexibility | 0.6 | 0.5 | 0.5 |

TABLE 5

|  | Example | | | |
|---|---|---|---|---|
|  | 3 | 4A | 4B | 5 |
| Bursting Pressure (kgf/cm²) | 100–120 | 100–120 | 100–120 | 100–120 |
| Gasoline Impermeability |  |  |  |  |
| Test gasoline | 0.5 or less | 0.5 or less | 0.5 or less | 0.5 or less |
| Mixed gasoline | 0.5 or less | 0.5 or less | 0.5 or less | 0.5 or less |
| Resistance to sour gasoline | ⊚ | ⊚ | ⊚ | ⊚ |
| Volume resistivity (Ω · cm) | $4.4 \times 10^6$ | $5.1 \times 10^4$ | $4.8 \times 10^5$ | $3.6 \times 10^4$ |
| Resistance to firing | ⊚ | ⊚ | ⊚ | ⊚ |
| Flexibility (kgf) | 0.65 | 0.65 | 0.52 | 0.55 |
| Flame resistance (sec.) | 48 | 52 | 50 | 51 |

TABLE 6

|  | Comparative Example | |
|---|---|---|
|  | 1 | 2 |
| Bursting Pressure (kgf/cm²) | 80–100 | 200 or higher |
| Gasoline Impermeability |  |  |
| Test gasoline | 0.5–1.0 | 0.5 or less |
| Mixed gasoline | 10–15 | 0.5 or less |
| Resistance to sour gasoline | Δ | ⊚ |
| Volume resistivity (Ω · cm) | $1.4 \times 10^{14}$ | $1.7 \times 10^{15}$ or higher |
| Resistance to firing | X | X |
| Flexibility (kgf) | 2.8 | 3.0 |
| Flame resistance (sec.) | 1 | 1 |

It will be understood from TABLES 4, 5 and 6 that Comparative Examples 1 and 2 require relatively large amounts of load to have the same flexural displacement (50 mnm), as compared with Examples 1–5 constructed according to the present invention, and that Examples 1–5 have excellent properties in respect of the gasoline impermeability, the resistance to sour gasoline and the flexibility. Further, such excellent properties can be achieved even with the fluorine-contained resin layer as the inner layer having a relatively small thickness. This leads to a reduced amount of expensive fluorine-contained resin to be used, permitting reduction in the cost of manufacture of the hose.

It will also be understood from TABLES 5 and 6 that Comparative Examples 1 and 2 are inferior in the flame resistance and the resistance to firing. In contrast, Examples 3–5 of the present invention are excellent in terms of the flame resistance and the resistance to firing, as well as the gasoline impermeability, the resistance to sour gasoline, and the flexibility. Further, Examples 3–5 have sufficiently high mechanical strength, assuring high degrees of wear resistance and shock resistance.

What is claimed is:

1. A fuel transporting hose used in a fuel pipe system, comprising:

an inner layer comprised of a fluorine-containing resin and having a thickness of 50 μm~0.5 mm;

an intermediate layer comprised of a rubber material and formed on an outer surface of said inner layer, said intermediate layer having a thickness of 0.6 mm~2.0 mm, said thickness of said intermediate layer being 3 to 30 times as that of said inner layer;

a fiber reinforcing layer formed on an outer surface of said intermediate layer; and an outer layer comprised of a rubber material and formed on an outer surface of said fiber reinforcing layer, said outer layer having a thickness of 0.5 mm~5 mm, said thickness of said outer layer being 3 to 35 times as that of said inner layer, wherein said inner layer is subjected to a surface treatment selected from the group consisting of: flame treatment; corona discharge method; sputtering; plasma treatment; and sodium treatment in which said outer surface of said inner layer is activated by removing fluorine therefrom.

2. A fuel transporting hose as defined in claim 1, wherein said fluorine-containing resin of said inner layer contains an electrically conductive additive.

3. A fuel transporting hose as defined in claim 2, wherein said inner layer has a volume resistivity of not higher than $10^{10}$ Ω·cm.

4. A fuel transporting hose as defined in claim 2, wherein said fluorine-containing resin contains 3–16 parts by weight of said electrically conductive additive, per 100 parts by weight of the fluorine-containing resin.

5. A fuel transporting hose as defined in claim 2, wherein said electrically conductive additive is carbon black or stainless steel fiber.

6. A fuel transporting hose as defined in claim 1, wherein said fluorine-containing resin of said inner layer is selected from the group consisting of: polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

7. A fuel transporting hose as defined in claim 1, wherein said rubber material of said intermediate layer is selected from the group consisting of: NBR; H-NBR; ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

8. A fuel transporting hose as defined in claim 1, wherein said fiber reinforcing layer is formed of a fibrous material selected from the group consisting of: nylon fiber, polyester fiber, aramid fiber and cotton fiber, said fiber being formed by braiding or spiraling on said outer surface of said intermediate layer.

9. A fuel transporting hose as defined in claim 1, wherein said rubber material of said outer layer is selected from the group consisting of: NBR; H-NBR; ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

10. A fuel transporting hose as defined in claim 1, further comprising an adhesive layer formed between said inner layer and said intermediate layer.

11. A fuel transporting hose used in a fuel pipe system, comprising:

an inner layer comprised of a fluorine-containing resin and having a thickness of 0.2±0.1 mm;

an intermediate layer comprised of a rubber material and formed on an outer surface of said inner layer, said intermediate layer having a thickness of 1.0±0.2 mm, said thickness of said intermediate layer being 3 to 30 times as that of said inner layer;

a fiber reinforcing layer formed on an outer surface of said intermediate layer; and an outer layer comprised of a rubber material and formed on an outer surface of said fiber reinforcing layer, said outer layer having a thickness of 2.0±1.0 mm, said thickness of said outer layer being 3 to 35 times as that of said inner layer.

12. A fuel transporting hose as defined in claim 11, wherein said fluorine-containing resin of said inner layer contains an electrically conductive additive.

13. A fuel transporting hose as defined in claim 12, wherein said inner layer has a volume resistivity of not higher than $10^{10}\Omega\cdot cm$.

14. A fuel transporting hose as defined in claim 12, wherein said fluorine-containing resin contains 3–16 parts by weight of said electrically conductive additive, per 100 parts by weight of the fluorine-containing resin.

15. A fuel transporting hose as defined in claim 12, wherein said electrically conductive additive is carbon black or stainless steel fiber.

16. A fuel transporting hose as defined in claim 11, wherein said fluorine-containing resin of said inner layer is selected from the group consisting of polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

17. A fuel transporting hose as defined in claim 11, wherein said rubber material of said intermediate layer is selected from the group consisting of NBR; H-NBR; ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

18. A fuel transporting hose as defined in claim 11, wherein said fiber reinforcing layer is formed of a fibrous material selected from the group consisting of nylon fiber, polyester fiber, aramid fiber and cotton fiber, said fiber being formed by braiding or spiraling on said outer surface of said intermediate layer.

19. A fuel transporting hose as defined in claim 11, wherein said rubber material of said outer layer is selected from the group consisting of NBR; H-NBR; ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

20. A fuel transporting hose as defined in claim 11, further comprising an adhesive layer formed between said inner layer and said intermediate layer.

* * * * *